Patented Nov. 3, 1953

2,658,089

UNITED STATES PATENT OFFICE 2,658,089

DEHYDROGENATION OF A GEM ALKYL ARYLCYCLOHEXANE

Vladimir N. Ipatieff and Herman Pines, Chicago, Ill., assignors to Universal Oil Products Company, Chicago, Ill., a corporation of Delaware No Drawing. Application April 28, 1950, Serial No. 158,912

17 Claims. (Cl. 260—668)

This invention relates to the conversion of an alkylaryl cyclohexane containing a geminal carbon atom into a polycyclic aromatic hydrocarbon. More particularly, the process relates to the conversion of a gem alkylarylcyclohexane into a fused ring polycyclic hydrocarbon having at least one ring more than said gem alkylarylcyclohexane.

By a cyclohexane hydrocarbon containing a geminal carbon atom, we mean a cyclohexane hydrocarbon having at least one carbon atom in the ring with two substituent hydrocarbon groups attached thereto, namely, an alkyl group and an aryl group. Thus, a gem alkylarylcyclohexane hydrocarbon comprises, for example, a 1-alkyl-1-aryl-cyclohexane in which the alkyl group contains from about 1 to about 5 carbon atoms and the aryl group is a phenyl group, a substituted phenyl group, a naphthyl group or other polycyclic aromatic hydrocarbon groups.

This invention is particularly applicable to the conversion of 1-alkyl-1-phenyl-cyclohexane hydrocarbons into fused ring polycyclic hydrocarbons such as fluorene and substituted fluorenes. The alkyl substituent group may be a methyl group but it is understood that the invention is also applicable to the treatment of gem alkylarylcyclohexane hydrocarbons in which the alkyl group includes an ethyl group, a propyl group, a butyl group and the like, also cycloalkyl groups, such as a cyclopentyl group, a cyclohexyl group, or a mixture of said alkyl and cycloalkyl groups.

One embodiment of this invention relates to a process which comprises dehydrogenating a 1-alkyl-1-arylcyclohexane in the presence of an acid-acting compound to form a fused ring polycyclic hydrocarbon having at least one ring more than said 1-alkyl-1-arylcyclohexane.

Another embodiment of this invention relates to a process for producing fluorene which comprises dehydrogenating 1-methyl-1-phenylcyclohexane in the presence of an alkyl halide to form a substantial yield of fluorene and recovering said fluorene.

A further embodiment of this invention relates to a process for producing fluorene which comprises dehydrogenating 1-methyl-1-phenyl-cyclohexane in the presence of a platinum catalyst and of an alkyl halide to form a substantial yield of fluorene and recovering said fluorene.

A still further embodiment of this invention relates to a process for producing fluorene which comprises dehydrogenating 1-methyl-1-phenyl-cyclohexane in the presence of a platinum catalyst and of an alkyl chloride to form a substantial yield of fluorene and recovering said fluorene.

We have found that when an alkylarylcyclohexane containing a geminal carbon atom such as 1-methyl-1-phenyl-cyclohexane is subjected to dehydrogenation treatment in the presence of a dehydrogenation catalyst such as platinized alumina, dehydrogenation and also demethylation reactions occur to produce diphenyl, methane and hydrogen as indicated by the following equation:

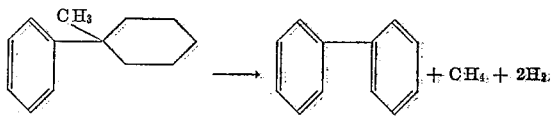

In the process of the present invention we have found that the above indicated demethylation can be avoided substantially during dehydrogenation by having present in the reaction mixture an acidic material or acid-producing compound such as an alkyl halide, a hydrogen halide, hydrogen chloride and the like. For example, when 5% by volume of butyl chloride is added to 1-methyl-1-phenylcyclohexane and the resultant mixture is passed over platinized alumina containing 5% by weight of platinum at a temperature of 300° C., the dehydrogenation is accompanied by ring formation whereby the bicyclic hydrocarbon starting material is converted into a tricyclic hydrocarbon, namely, fluorene, together with hydrogen as indicated by the following equation:

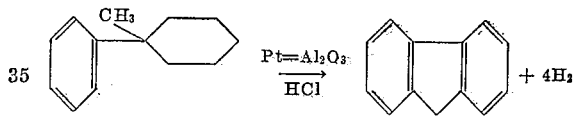

Although the acid-producing material or acidic material employed in this process to promote isomerization during dehydrogenation may be added continuously or intermittently together with the hydrocarbon charging stock, a dehydrogenation catalyst may also be prepared in which a stable acid-acting compound is present therein as well as a material which promotes dehydrogenation. Thus, the presence of small amounts of silica-alumina mixed with a dehydrogenation catalyst will promote both dehydrogenation and isomerization. Also the addition of a small amount of hydrofluoric or hydrochloric acid to alumina forms an acid-type catalyst suitable for promoting the dehydrogenation and isomerization reactions of this process.

This dehydrogenation and formation of polycyclic aromatic hydrocarbons is not limited to the conversion of 1-methyl-1-phenyl-cyclohexane into fluorene but it can be extended to other bicyclic hydrocarbons containing a geminal carbon atom in which one of the hydrocarbon groups combined with said geminal carbon atom is an aromatic hydrocarbon group while the other group is selected from the members of the class consisting of alkyl and cycloalkyl groups.

The catalysts preferred in this process comprise platinum and also platinum supported on alumina or other suitable carriers such as silica, charcoal, pumice, crushed porcelain, and the like. With the platinum catalyst, the dehydrogenation temperature generally utilized is from about 250° to about 450° C. Other suitable dehydrogenation catalysts such as alumina (or other suitable carriers) composited with a compound, and particularly with an oxide of an element selected from the members of the left-hand columns of groups IV, V and VI of the periodic table or mixtures thereof and more particularly alumina-chromia or alumina-molybdenum oxide may be employed within the scope of the present invention but not necessarily under the same conditions of treatment and not necessarily with equivalent results. These other catalysts which do not contain platinum are generally employed at a higher temperature than that used with the platinum catalyst but generally at a temperature below about 500° C.

The polycyclic hydrocarbons formed by the process of this invention are useful as intermediates in organic synthesis and particularly as intermediates in the production of dyes, medicinals, insecticides and the like. Some of the polycyclic hydrocarbons such as fluorene and various substituted fluorenes are also converted into resins and plastics by suitable polymerization and condensation treatment.

The invention is illustrated further by the following examples but it is to be understood that the broad scope of the invention is not limited thereto.

*Example I*

1-methyl-1-phenyl-cyclohexane was obtained by alkylating benzene with methylcyclohexene in the presence of hydrogen fluoride catalyst. The 1-methyl-1-phenyl-cyclohexene was then passed over platinized alumina (5% by weight of platinum) at a temperature of 300° C. to form diphenyl, methane and hydrogen. 30% by weight of the charged 1-methyl-1-phenyl-cyclohexene underwent conversion per pass.

*Example II*

Some of the 1-methyl-1-phenyl-cyclohexane prepared as indicated in Example I was mixed with 5% by weight of secondary butylchloride and the resultant mixture was then passed over platinized alumina catalyst as used in Example I maintained at a temperature of 300° C. This dehydrogenation treatment in the presence of the added butylchloride resulted in the formation of 25% by weight of fluorene per pass. The gaseous product of this dehydrogenation treatment consisted essentially of hydrogen.

We claim as our invention:

1. A process which comprises dehydrogenating a 1-alkyl-1-arylcyclohexane in the presence of a dehydrogenation catalyst and an acid-acting isomerizing catalyst to form a fused ring polycyclic hydrocarbon having at least one ring more than said 1-alkyl-1-arylcyclohexane.

2. The process of claim 1 further characterized in that the isomerizing catalyst comprises a halide selected from the group consisting of hydrogen chloride and a butyl chloride.

3. The process of claim 2 further characterized in that the dehydrogenation catalyst is a platinum-alumina composite.

4. A process for producing fluorene which comprises dehydrogenating 1-methyl-1-phenyl-cyclohexane in the presence of a dehydrogenation catalyst and an alkyl halide to form a substantial yield of fluorene and recovering said fluorene.

5. A process for producing fluorene which comprises dehydrogenating 1-methyl-1-phenylcyclohexane in the presence of a platinum catalyst and of an alkyl halide to form a substantial yield of fluorene and recovering said fluorene.

6. A process for producing fluorene which comprises dehydrogenating 1-methyl-1-phenylcyclohexane in the presence of a platinum catalyst and of an alkyl chloride to form a substantial yield of fluorene and recovering said fluorene.

7. A process which comprises dehydrogenating a 1-alkyl-1-arylcyclohexane in the presence of an acid-acting isomerizing catalyst and of a platinum catalyst at a temperature of from about 250° to about 450° C. to form a fused ring polycyclic hydrocarbon having at least one ring more than said 1-alkyl-1-arylcyclohexane.

8. A process which comprises dehydrogenating a 1-alkyl-1-arylcyclohexane in the presence of an acid-acting isomerizing catalyst and in the presence of a catalyst comprising essentially a carrier and an oxide of an element selected from the members of the left hand columns of groups IV, V and VI of the periodic table at a temperature of from about 250° to about 500° C. to form a fused ring polycyclic hydrocarbon having at least one ring more than said 1-alkyl-1-arylcyclohexane.

9. A process for producing fluorene which comprises dehydrogenating 1-methyl-1-phenyl-cyclohexane in the presence of a platinum catalyst and of an alkyl halide at a temperature of from about 250° to about 450° C. to form a substantial yield of fluorene and recovering said fluorene.

10. A process for producing fluorene which comprises dehydrogenating 1-methyl-1-phenyl-cyclohexane in the presence of a platinum catalyst and of an alkyl chloride at a temperature of from about 250° to about 450° C. to form a substantial yield of fluorene and recovering said fluorene.

11. A process for producing fluorene which comprises dehydrogenating 1-methyl-1-phenyl-cyclohexane in the presence of a platinum catalyst and of a butyl chloride at a temperature of from about 250° to about 450° C. to form a substantial yield of fluorene and recovering said fluorene.

12. A process for producing fluorene which comprises dehydrogenating 1-methyl-1-phenyl-cyclohexane in the presence of a platinum-alumina catalyst and of a butyl chloride at a temperature of from about 250° to about 450° C. to form a substantial yield of fluorene and recovering said fluorene.

13. A process which comprises dehydrogenating a 1-alkyl-1-arylcyclohexane in the presence of a dehydrogenation catalyst and an acid-acting halogen-containing compound to form a fused ring polycyclic hydrocarbon having at least one ring more than said 1-alkyl-1-arylcyclohexane.

14. A process which comprises dehydrogenating a 1-alkyl-1-arylcyclohexane in the presence of a dehydrogenation catalyst and an acid-acting halogen-containing compound selected from the group consisting of alkyl halides and hydrogen halides to form a fused ring polycyclic hydrocarbon having at least one ring more than said 1-alkyl-1-arylcyclohexane.

15. A process for producing fluorene which comprises dehydrogenating 1-methyl-1-phenyl-cyclohexane in the presence of a platinum-alumina catalyst and of hydrogen chloride at a temperature of from about 250° to about 450° C. to form a substantial yield of fluorene and recovering said fluorene.

16. A process which comprises dehydrogenating a 1-alkyl-1-arylcyclohexane in the presence of a platinum-alumina catalyst and a halide selected from the group consisting of hydrogen chloride and a butyl chloride at a temperature of from about 250° to about 450° C. to form a fused ring polycyclic hydrocarbon having at least one ring more than said 1-alkyl-1-arylcyclohexane.

17. A process for producing fluorene which comprises dehydrogenating 1-methyl-1-phenyl-cyclohexane in the presence of a platinum-alumina catalyst and a halide selected from the group consisting of hydrogen chloride and a butyl chloride at a temperature of from about 250° to about 450° C. to form a substantial yield of fluorene and recovering said fluorene.

VLADIMIR N. IPATIEFF.
HERMAN PINES.

References Cited in the file of this patent

UNITED STATES PATENTS

| Number | Name | Date |
|---|---|---|
| 2,272,266 | Grosse et al. | Feb. 10, 1942 |
| 2,414,118 | Orchin | Jan. 14, 1947 |
| 2,519,577 | Ipatieff et al. | Aug. 22, 1950 |